United States Patent

Bäthis et al.

[11] Patent Number: 6,142,523
[45] Date of Patent: Nov. 7, 2000

[54] STEERING SPINDLE PROVIDED FOR MOUNTING ON A BODY PART OF A MOTOR VEHICLE

[75] Inventors: Peter Bäthis, Eppertshausen; Raimund Grabis, Grossotheim, both of Germany

[73] Assignee: Mannesmann VDO AG, Frankfurt, Germany

[21] Appl. No.: 09/213,509

[22] Filed: Dec. 17, 1998

[30] Foreign Application Priority Data

Dec. 23, 1997 [DE] Germany .......................... 197 57 322

[51] Int. Cl.[7] ....................................................... B62D 1/19
[52] U.S. Cl. ............................................................. 280/777
[58] Field of Search ............................................. 280/777

[56] References Cited

U.S. PATENT DOCUMENTS

| 5,520,416 | 5/1996 | Singer, III et al. ..................... 280/777 |
| 5,618,058 | 4/1997 | Byon ....................................... 280/777 |
| 5,623,756 | 4/1997 | Yanagidate et al. ................... 280/777 |
| 5,640,884 | 6/1997 | Jujiu et al. ............................. 280/777 |
| 5,669,633 | 9/1997 | Näff et al. ............................. 280/777 |
| 5,685,565 | 11/1997 | Schäfer et al. ........................ 280/777 |

*Primary Examiner*—Kenneth R. Rice
*Attorney, Agent, or Firm*—Martin A. Farber

[57] ABSTRACT

A profile steering spindle of a motor vehicle has a telescopic profile piece, which can be displaced in the axial direction by an adjusting tube, and into which project a first profile piece close to the steering wheel and a second profile piece remote from the steering wheel, intended for retaining a steering wheel. During axial displacements, the second profile piece remote from the steering wheel can be displaced relative to the telescopic profile piece by an adjusting tube without expenditure of force. The first profile piece close to the steering wheel is connected to the telescopic profile piece by means of bending lugs. If the driver of the motor vehicle strikes the steering wheel, the bending lugs are held by the telescopic profile piece, and the first profile piece close to the steering wheel is torn. The kinetic energy is thereby absorbed.

13 Claims, 2 Drawing Sheets

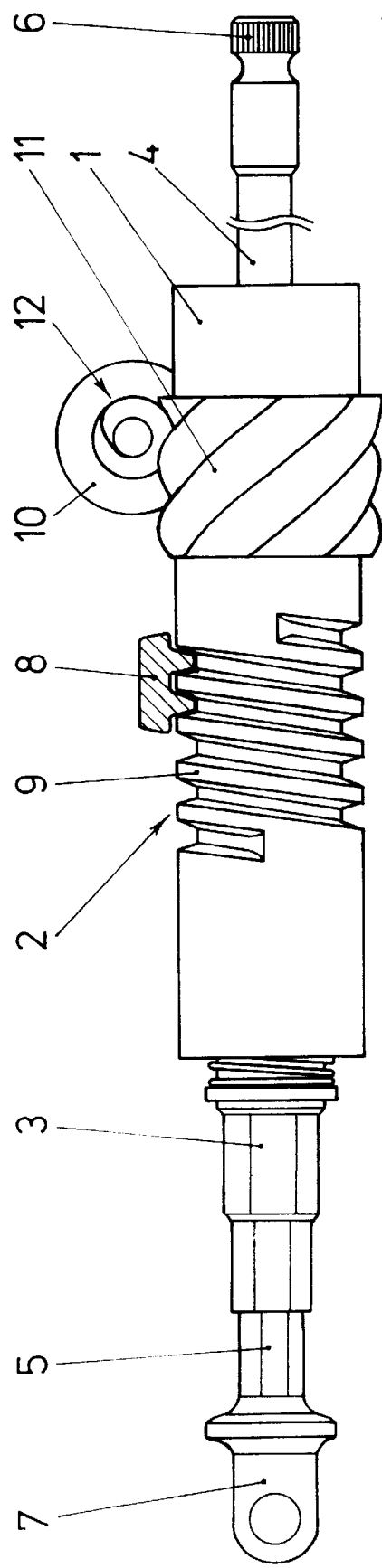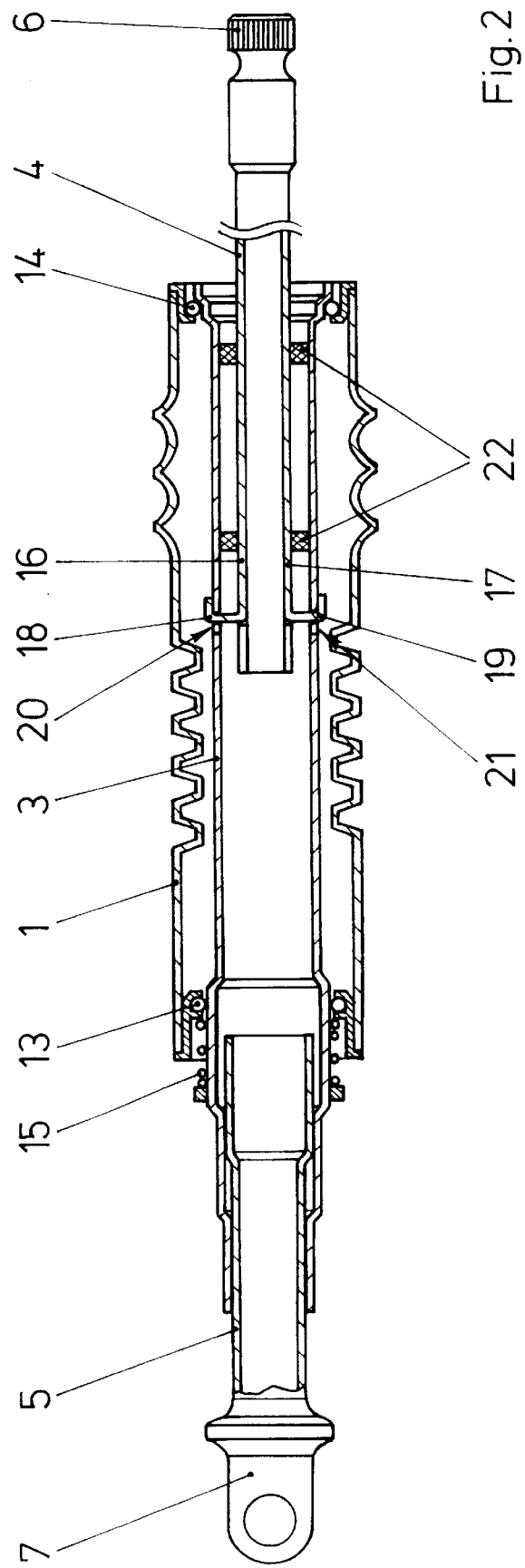

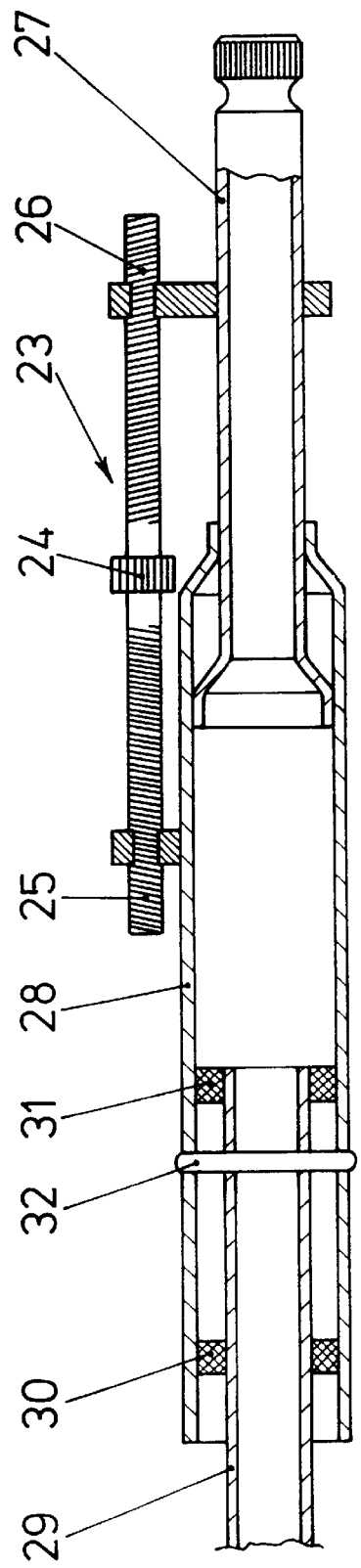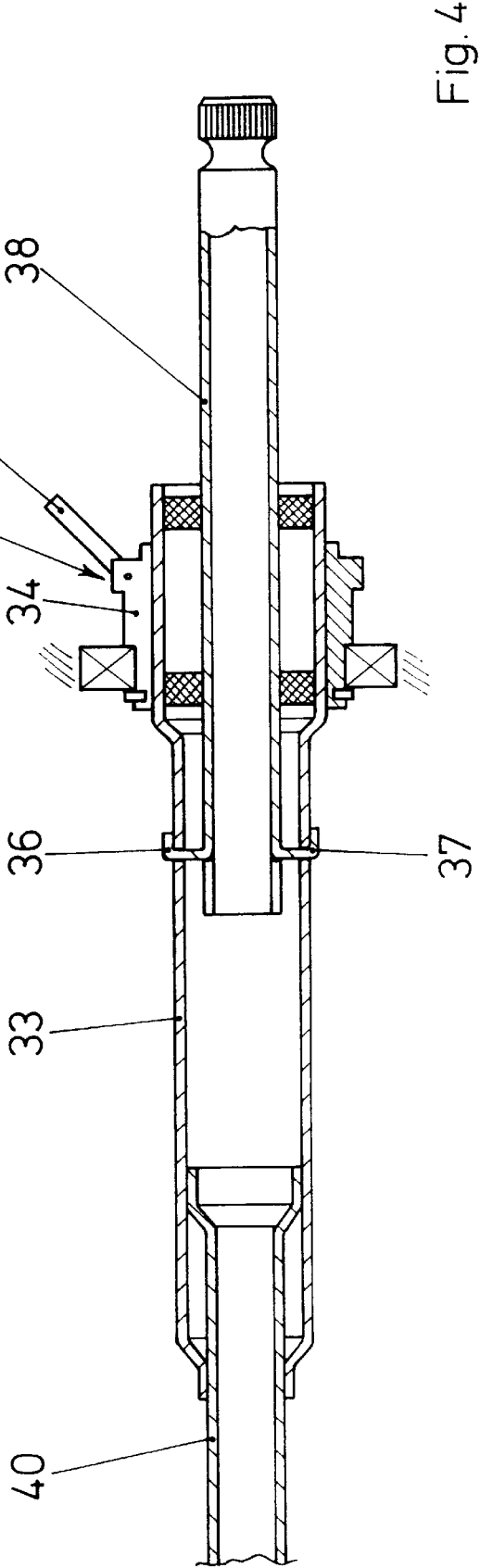

STEERING SPINDLE PROVIDED FOR MOUNTING ON A BODY PART OF A MOTOR VEHICLE

FIELD AND BACKGROUND OF THE INVENTION

The invention relates to a steering spindle provided for mounting on a body part of a motor vehicle and intended for a steering device, having a telescopic first profile piece, which encloses a first profile piece at least in one end region, and a shock-absorbing member for absorbing kinetic energy during a movement of the first profile piece relative to the telescopic first profile piece.

Such steering spindles are often used in modern motor vehicles and are thus known. The shock-absorbing member, in the event of the motor vehicle crashing, serves to convert kinetic energy between the telescopic first profile piece and the first profile piece into plastic deformation. In this way, in particular if the head of the driver strikes the steering wheel, head injuries are kept especially slight. A disadvantage of the known steering spindle is that the steering wheel in the case of this steering spindle cannot be shifted into a desired position by the driver.

The possibility of pushing the first profile piece into the telescopic profile piece in order to adjust the steering wheel could be considered. In this case, however, the shock-absorbing member is likewise adjusted or deformed, so that the manual adjustment turns out to be very sluggish. Furthermore, due to this design, no intended force characteristic can be produced during the absorption of the kinetic energy by the shock-absorbing member in the event of a crash.

The problem addressed by the invention is to design a steering spindle of the foregoing type in such a way that a steering wheel, with this steering spindle, can be shifted as simply as possible into a desired position by the driver and that the shock-absorbing member, in the event of a crash, absorbs the kinetic energy irrespective of the position of the steering wheel.

SUMMARY OF THE INVENTION

This problem is solved according to the invention in that a second profile piece displaceable in the axial direction relative to the telescopic profile piece by an adjusting device is arranged on that side of the telescopic profile piece which is remote from the first profile piece. Either the first profile piece is connected to a steering wheel and the second profile piece is connected to a steering mechanism or the first profile piece is connected to a steering mechanism and the second profile piece is connected to a steering wheel.

By this design, the steering spindle, in the event of a crash and during the manual adjustment, can be telescoped at points which are spatially separate from one another. In the event of the motor vehicle crashing, the kinetic energy, as in the known steering spindle, is absorbed uniformly by the shock-absorbing member by a displacement of the first profile piece. During a manual adjustment of the steering wheel, the telescopic profile piece is displaced relative to the second profile piece. Therefore different force characteristics can be provided in a simple manner during the manual adjustment and the displacement caused by the crash. A further advantage of this design is provided by the fact that the steering spindle according to the invention consists of few components, which are simple to produce and in addition can be preassembled outside the motor vehicle. As a result, the steering spindle according to the invention is especially cost-effective.

In an advantageous development of the invention, the adjusting device is to be of especially simple design if it has an adjusting tube which supports the telescopic profile piece and can be secured to the body part in an intended position.

The shock-absorbing member, in the event of a crash, has a constant force characteristic as a function of the travel of the first profile piece relative to the telescopic profile piece if it has at least one tear strip, which is made in first piece with the first profile piece and is fastened at one end to the telescopic profile piece. In the event of the motor vehicle crashing, the tear strips tear the first profile piece, so that the latter can penetrate into the telescopic profile piece. In the process, the kinetic energy is absorbed by the tearing of the first profile piece. In this case, the force which is required to tear the first profile piece is constant over virtually the entire travel of the first profile piece.

In another advantageous development of the invention, the shock-absorbing member can be installed in an especially simple manner if the ends of the tear strips are designed as bending lugs penetrating into recesses of the telescopic profile piece. To assemble the steering spindle, the bending lugs can be bent into the recesses in a simple manner. In the event of the motor vehicle crashing, the ends are held in the recess in a positive-locking and/or frictional manner.

In another advantageous development of the invention, forces which occur during normal operation of the motor vehicle are absorbed without deformation or tearing of the shock-absorbing member if the shock-absorbing member has a shearing pin passing through the first profile piece and the telescopic profile piece. Such shearing pins are commonly used in engineering and can be calculated very accurately for an intended shearing force. In the event of the motor vehicle crashing, the shearing pins shear off, so that the shock-absorbing member can subsequently absorb the kinetic energy.

The shock-absorbing member could be arranged, for example, on a profile piece remote from the steering wheel. However, this results in a very large number of components being arranged on the steering wheel, a factor which leads to a high mass moment of inertia of the steering wheel. A high mass moment of inertia of the steering wheel leads to a high risk of injury if the head of the driver strikes the steering wheel. In another advantageous development of the invention, the mass moment of inertia of the steering wheel can be kept especially small if the shock-absorbing member is arranged on the profile piece close to the steering wheel.

In order to transmit torque, the profile pieces and the telescopic profile piece must have mutually positive-locking connections. The profile pieces could each be designed as a splined shaft and engage in a positive-locking manner in a corresponding internal tooth system of the telescopic profile piece. However, in another advantageous development of the invention, the profile pieces and the telescopic profile piece are especially cost-effective if the profile pieces and the telescopic profile piece in each case have a hexagonal cross section in adjacent regions.

In another advantageous development of the invention, the steering wheel can be adjusted manually in its position by simple rotation of the adjusting tube if the adjusting tube has an external thread interacting with a nut intended for fastening to the body part. Of course, an individual bolt having a contour corresponding to the external thread is also suitable as the nut.

In another advantageous development of the invention, the adjusting tube is held automatically in its position after the position of the steering wheel has been set if the adjusting tube can be rotated by worm gearing. Due to the self-locking of the worm gearing, a locking device, to be arranged separately, for the adjusting tube can generally be dispensed with.

The worm gearing could be adjusted, for example, by means of a crank. However, this results in the steering spindle according to the invention having especially large dimensions. Furthermore, this design requires the arrangement of the adjusting tube and the telescopic profile piece in a position especially close to the steering wheel or complicated laying of a crankshaft of the crank. In another advantageous development of the invention, the adjusting tube and the telescopic profile piece can be arranged at virtually any point in the steering spindle if the worm gearing can be driven by an electric motor intended for fastening to the body part.

In another advantageous development of the invention, the steering wheel can be shifted especially quickly into an intended position if the adjusting device has a clamping socket, which is intended for fastening to the body part, encloses the adjusting tube or the telescopic profile piece and has an actuating element selectively opening or closing the clamping socket. Due to this design, the steering wheel can be displaced into the intended position in a simple manner after the clamping socket has been opened. The clamping socket is then closed. The steering wheel is thereby held in its intended position in a frictional manner.

In another advantageous development of the invention, the profile piece having the shock-absorbing member is reliably guided in the telescopic profile piece in the event of a crash if sliding bearings for the axial guidance of the profile piece are arranged between the telescopic profile piece and the profile piece which is displaced in the event of a crash. In this way, canting of the one profile piece in the telescopic profile piece is avoided in the event of a crash.

In another advantageous development of the invention, kinetic energy which occurs in the event of a crash can be converted into frictional heat in a simple manner if the sliding bearings are designed to produce intended friction during a relative movement between the first profile piece and the telescopic profile piece. In this way, virtually any force characteristic can be produced during the relative movement between the first profile piece and the telescopic profile piece. Due to this design, the steering spindle according to the invention can also be produced in an especially cost-effective manner.

BRIEF DESCRIPTION OF THE DRAWINGS

The invention permits numerous embodiments. For further clarification of its basic principle, three of them are described below and are shown in the drawing, in which:

FIG. 1 shows a steering spindle according to the invention having an adjusting device, FIG. 2 shows the steering spindle from FIG. 1 in a sectional representation, FIGS. 3, 4 show further embodiments of the steering spindle according to the invention.

DETAILED DESCRIPTION OF THE PREFERRED EMBODIMENTS

FIG. 1 shows a steering spindle, according to the invention, of a motor vehicle, the steering spindle having an adjusting device 2, which has an adjusting tube 1. The adjusting tube 1 accommodates a telescopic profile piece 3 of hexagonal design at its outer end. A profile piece 4 close to the steering wheel and a profile piece 5 remote from the steering wheel project into the telescopic profile piece 3. The profile piece 4 close to the steering wheel has at its free end a multiple-tooth connecting piece 6 for connection of a steering wheel (not shown). The profile piece 5 remote from the steering wheel has at its free end a connecting piece 7 for connection to a universal joint of a steering mechanism. The adjusting device 2 has an external thread 9, which is arranged on the adjusting tube 1 and meshes with a fixed nut 8, and a worm wheel 11 of worm gearing 12, the worm wheel 11 being drivable by means of an electric motor 10. The adjusting tube 1 is thereby rotated and moved by the fixed nut 8 in the axial direction.

FIG. 2 shows the steering spindle according to the invention from FIG. 1 in a sectional representation. Bearings 13, 14 for the telescopic profile piece 3 are arranged in the adjusting tube 1, one of the bearings 13 being preloaded by a spring 15 in order to compensate for length tolerances. The two profile pieces 4, 5 have a hexagonal cross section (another polygonal cross section, e.g. quadrilateral, is also conceivable, the telescopic profile piece then being designed accordingly) and are connected to the telescopic profile piece 3 in a rotationally locked manner. The profile piece 5 remote from the steering wheel can be displaced axially relative to the telescopic profile piece 3 in a rotationally locked manner. The profile piece 5 remote from the steering wheel can be displaced axially relative to the telescopic profile piece 3, whereas the profile piece 4 close to the steering wheel is fastened to the telescopic profile piece 3 by means of a plurality of tear strips 16, 17, the ends of which are designed as bending lugs 18, 19 and penetrate into recesses 20, 21 of the telescopic profile piece 3. Furthermore, sliding bearings 22 are arranged between the telescopic profile piece 3 and the profile piece 4 close to the steering wheel. Due to this design, torque is transmitted from the profile piece 4 close to the steering wheel to the profile piece 5 remote from the steering wheel, while the adjusting tube 1 is stationary due to the self-locking of the worm gearing 12.

During rotation of the adjusting tube 1, the telescopic profile piece 3 is displaced in the axial direction and performs a movement relative to the profile piece 5 remote from the steering wheel. In this way, the distance between the two profile pieces 4, 5 and thus the position of the multiple-tooth connecting piece 6 retaining the steering wheel can be manually adjusted. If, in the event of the motor vehicle crashing, a large force is exerted on the profile piece 4 close to the steering wheel, for examples by the head of the driver striking the steering wheel, the bending lugs 18, 19 of the tear strips are held in place in the recesses 20, 21 of the telescopic profile piece 3, while the profile piece 4 close to the steering wheel moves in the direction of the profile piece 5 remote from the steering wheel. In this way, the tear strips 16, 17 tear the profile piece 4 close to the steering wheel, as a result of which some of the kinetic energy is absorbed. During this movement, the profile piece 4 close to the steering wheel is guided by the sliding bearings 22.

FIG. 3 shows a further embodiment of the steering spindle according to the invention in a schematic representation. In this case, an adjusting device 23 has an adjusting screw 24 with a left-hand thread 25 and a right-hand thread 26 for the manual displacement of a profile piece 27 close the steering wheel relative to a telescopic profile piece 28. A profile piece 29 remote from the steering wheel is inserted in that end of the telescopic profile piece 28 which is remote from the profile piece 27 close to the steering wheel. The profile piece 29 remote from the steering wheel is held in the depicted position by sliding bearings 30, 31 and a shearing pin 32. The shearing pin 32 serves to absorb forces which occur during normal operation of the motor vehicle and to break in the event of the motor vehicle crashing. After the shearing pin 32 has broken, the profile piece 29 remote from the steering wheel can move into the telescopic profile piece 28, in the course of which it is guided by the sliding bearings 30, 31. In the process, the sliding bearings 30, 31 produce friction, which dampens the movement.

FIG. 4 shows a further embodiment of the steering spindle according to the invention, in which a telescopic profile piece 33 is held in the depicted position by an adjusting device 39 having a clamping socket 34 mounted opposite a fixed body part. The clamping socket 34 can be opened and closed by means of a lever 35. When the clamping socket 34 is open, the telescopic profile piece 33 can be easily displaced in the axial direction relative to a profile piece 40 remote from the steering wheel. A profile piece 38 close to the steering wheel moves along with it in the process, this profile piece 38 being fastened to the telescopic profile piece 33 by bending lugs 36, 37. When the clamping socket 34 is closed, in order to displace the profile piece 38 close to the steering wheel as in the case of the steering spindle from FIGS. 1 and 2, a high expenditure of force is required to tear the profile piece 38 close to the steering wheel.

What is claimed is:

1. A steering spindle for interconnecting a steering wheel with a steering mechanism, and for mounting on a body part of a motor vehicle, comprising:
    a first profile piece and a second profile piece, an adjusting device, and a telescopic profile piece which engages telescopically with said first profile piece at least in one end region, said telescopic profile piece connecting between said first and said second profile piece pieces and engaging telescopically with said second profile piece at least in one end region;
    a shock-absorbing member for absorbing kinetic energy during a movement of the first profile piece relative to the telescopic profile piece, said shock-absorbing member lying between said telescopic profile piece and said first profile piece to be carried with said telescopic profile piece upon movement thereof by said adjustment device;
    wherein said second profile piece is displaceable in an axial direction relative to said telescopic profile piece by said adjusting device;
    said second profile piece is arranged on that side of said telescopic profile piece which is remote from said first profile piece, in which case either said first profile piece is connected to the steering wheel and said second profile piece is connected to the steering mechanism or said first profile piece is connected to the steering mechanism and said second profile piece is connected to the steering wheel; and
    said adjusting device envelopes said telescopic profile piece for axial displacement of said telescopic profile piece concurrently with said shock-absorbing member and said first profile piece.

2. The steering spindle as claimed in claim 1, wherein said adjusting device has an adjusting tube which supports said telescopic profile piece and is securable to the body part in an intended position.

3. The steering spindle as claimed in claim 1, wherein said shock-absorbing member has at least one tear strip, which is made in one piece with said first profile piece and is fastened at one end to said telescopic profile piece.

4. The steering spindle as claimed in claim 3, wherein the ends of said tear strips are designed as bending lugs penetrating into recesses of said telescopic profile piece.

5. The steering spindle as claimed in claim 1, wherein said shock-absorbing member has a shearing pin passing through said first profile piece and said telescopic profile piece.

6. The steering spindle as claimed in claim 1, wherein said shock-absorbing member is arranged on said first profile piece close to the steering wheel.

7. The steering spindle as claimed in claim 1, wherein said first and said second profile pieces, and said telescopic profile piece in each case have a hexagonal cross section in mating regions of said telescopic profile piece with respectively said first and said second profile pieces.

8. A steering spindle for interconnecting a steering wheel with a steering mechanism, and for mounting on a body part of a motor vehicle, comprising:
    a first profile piece and a second profile piece, an adjusting device, and a telescopic profile piece which encloses said first profile piece at least in one end region;
    a shock-absorbing member for absorbing kinetic energy during a movement of the first profile piece relative to the telescopic profile piece;
    wherein said second profile piece is displaceable in an axial direction relative to said telescopic profile piece by said adjusting device;
    said second profile piece is arranged on that side of said telescopic profile piece which is remote from said first profile piece, in which case either said first profile piece is connected to the steering wheel and said second profile piece is connected to the steering mechanism or said first profile piece is connected to the steering mechanism and said second profile piece is connected to the steering wheel; and
    said adjusting device has an adjusting tube which supports said telescopic profile piece and is securable to the body part in an intended position; and
    said adjusting tube has an external thread interacting with a nut intended for fastening to the body part.

9. A steering spindle for interconnecting a steering wheel with a steering mechanism, and for mounting on a body part of a motor vehicle, comprising:
    a first profile piece and a second profile piece, an adjusting device, and a telescopic profile piece which encloses said first profile piece at least in one end region;
    a shock-absorbing member for absorbing kinetic energy during a movement of the first profile piece relative to the telescopic profile piece;
    wherein said second profile piece is displaceable in an axial direction relative to said telescopic profile piece by said adjusting device;
    said second profile piece is arranged on that side of said telescopic profile piece which is remote from said first profile piece, in which case either said first profile piece is connected to the steering wheel and said second profile piece is connected to the steering mechanism or said first profile piece is connected to the steering mechanism and said second profile piece is connected to the steering wheel;
    said adjusting device has an adjusting tube which supports said telescopic profile piece and is securable to the body part in an intended position; and
    said adjusting tube is rotatable by worm gearing.

10. The steering spindle as claimed in claim 9, wherein said worm gearing is drivable by an electric motor intended for fastening to the body part.

11. The steering spindle as claimed in claim 2, wherein said adjusting device has a clamping socket, which is intended for fastening to the body part, encloses one of said adjusting tube or said telescopic profile piece, and has an actuating element selectively opening or closing said clamping socket.

12. The steering spindle as claimed in claim 1, further comprising sliding bearings, wherein said sliding bearings provide for axial guidance of said profile piece, and are arranged between said telescopic profile piece and said first profile piece, said first profile piece being displaceable in the event of a crash.

13. The steering spindle as claimed in claim 12, wherein said sliding bearings are operative to produce intended friction during a relative movement between said first profile piece and said telescopic profile piece.

* * * * *